March 1, 1932.  A. L. NILSSON  1,847,571
CARBURETOR
Filed April 7, 1928
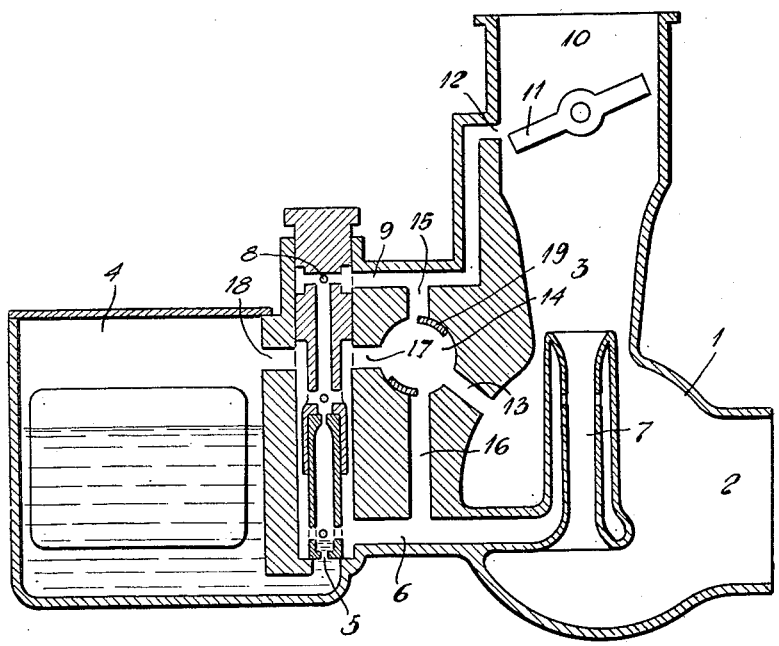

Patented Mar. 1, 1932

1,847,571

UNITED STATES PATENT OFFICE

AUGUST LEANDER NILSSON, OF SODERTALJE, SWEDEN

CARBURETOR

Application filed April 7, 1928, Serial No. 268,255, and in Germany April 14, 1927.

This invention relates to carburetors and more particularly, to a carburetor constructed in such a manner that the ratio of fuel to air may be changed under different operating conditions.

The present invention provides a carburetor which, first, will facilitate the regulation of the mixing relation at the transition from idle running to running under load and, second, will automatically effect regulation of the amount of fuel in relation to the rarefaction of the air in the air-intake on an increased speed of the motor.

The arrangement provided according to the invention is substantially characterized by the fact that the air-intake of the carburetor is connected, through one or more conduits, first, with the conduit from the idle running calibrated opening of the carburetor, second, with the conduit from the main calibrated opening and, third, with the hermetically closed fuel container of the carburetor, in such a manner that variations in the velocity of the air through the air-intake, and an increased or decreased rarefaction therein involved by said variations, are imparted to the said conduits as well as to the fuel container, so that the quantities of fuel flowing through the nozzles and from the container are regulated thereby.

The accompanying drawing illustrates by way of diagrammatic representation a vertical section of a carburetor arranged in accordance with the invention.

1 designates the carburetor casing froming within it the air-intake 2 and the so-called air-cone 3. 4 denotes the hermetically closed fuel container. 5 is the main nozzle of the carburetor, which nozzle communicates through the conduit 6 with the atomizer 7, the latter opening in the transition between the air-intake 2 and the air-cone 3. 8 is the idle running nozzle, from which extends the conduit 9 opening into the space 10 situated above the air-cone 3, said space 10 having provided therein the throttling member 11 adapted with its edge to shut off or to uncover, more or less, the mouth 12 of the conduit 9 extending from the idle running calibrated opening. In accordance with the invention, a conduit 13 extends from the air-intake 2 into a chamber 14 communicating through the conduit 15 with the idle running conduit 9, and through the conduit 16 with the main conduit 6, and through the conduits 17 and 18 with the fuel supply 4. Between the fuel container 4 and the chamber 14, is a well which communicates with the idling conduit 9 and the main fuel conduit 6. The well also communicates with the fuel container 4 by means of the conduit 18 and with the chamber 14 by means of the conduit 17.

The arrangement operates in the following manner:

If in shifting from idle running to running under load the throttling member 11 is so adjusted as to shut off the mouth 12 more or less, then air is caused to flow, by reason of the rarefaction in the space 10, from the chamber 14 to the channel 9 and out through the same, so that a rarefaction will be produced in the chamber 14, said rarefaction in turn causing a flow of air from the air-intake 2 through the conduit 13 to the chamber 14. If the throttling member 11 is opened so much that there will be produced in the air-cone 3 and the atomizer 7, a rarefaction great enough to bring about a flow of air from the chamber 14 through the conduits 16 and 6 and out through the atomizer 7, the said rarefaction in the air-cone 3 will also, to a certain extent, influence the rarefaction in the chamber 14.

The velocity of air through the channel 13 is determinative of the rarefaction in the chamber 14 and thus also of the rarefaction in the container 4, which communicates with the chamber 14 through the conduits 17 and 18. By an alteration of the passage area of the channel 13, the rarefaction in the chamber 14 and in the container 4 respectively can thus be altered independently of the velocity of the air past the throttling member 11 or through the air-cone 3.

As the escape of the fuel from the main calibrated opening 5 and the atomizer 7 respectively is determined both by the rarefaction about the atomizer in the air-cone 3 and by the rarefaction in the container 4, no escape from the atomizer 7 can take place before the rarefaction in the air-cone 3 has become greater than the rarefaction in the container 4.

By the possibility of thus varying the rarefaction in the container 4, the escape of fuel from the atomizer 7 can be accelerated or retarded independently of the rarefaction or the velocity of air in the air-cone 3.

With the arrangement above described, a further regulating means may be advantageously combined, said means influencing the fuel mixture at all loads and speeds. Said means consists in a slide 19 provided in the chamber 14, which slide is adapted to effect an increase or decrease of the passage areas of the channels 15 and 16. An increase of said areas, for instance, would result in a decrease of the outflow of fuel both from the idle running calibrated opening 8 and the main nozzle 5, whereby the fuel mixture will be poorer. Here, there are two circumstances aiding toward a decrease of the escape of fuel. In the first place, the rarefaction effecting sucking of fuel from the idle running calibrated opening 8 and the main calibrated opening 5 is reduced by reason of the increased areas and, secondly, the rarefaction is increased in the container 4 by the increased velocity of air through conduit 13, so that the outflow from the container is more powerfully restrained. Fnally, the fuel from the respective nozzles will be mixed with a larger amount of air in the channels 9 and 6 respectively.

If the passage areas of channels 15 and 16 are reduced the action will be the reversed, that is to say, the outflow is increased and the mixture will be richer in fuel.

What I claim is:—

1. The combination with a carburetor having a fuel container, a calibrated opening therefor, an atomizer, an idling outlet, conduits leading from said calibrated opening to said atomizer and said idling outlet respectively, and a mixing chamber surrounding said atomizer and having an air inlet and a fuel mixture outlet and provided with a restricted portion adjacent the outlet of said atomizer, of a second chamber, conduits respectively connecting said second chamber and said container, said second chamber and said mixing chamber at the inlet side of said restricted portion, and said second chamber and each of said conduits leading to said atomizer and to said idling outlet, and valve means for controlling the passage of fluid between said second chamber and the conduits leading to said atomizer and to said idling outlet, said valve also controlling the passage of fluid between said inlet side of said mixing chamber and said conduit leading to said idling outlet, and permitting free passage of fluid between the inlet side of the mixing chamber and the container.

2. In a carburetor, the combination with a fuel container closed to atmosphere, an air-mixture passage having an air inlet and a mixture outlet, said passage having an intermediate restricted portion above the container fuel level, a main fuel outlet at the restricted portion of said passage, a conduit connecting said container and main fuel outlet, a throttle in said passage adjacent the mixture outlet, an idling conduit extending from said container to an idling outlet adjacent said throttle, and a calibrated opening in said idling conduit, a well adjacent said container, of a chamber above the container fuel level, means for establishing a reduced pressure in said chamber which is dependent upon the relative pressures at the air inlet and mixture outlet end of said passage, said means comprising ports opening from said chamber into said idling conduit above the said calibrated opening and into said passage between the air inlet and the restricted portion thereof, and a conduit passing through said well, between said chamber and said container above the fuel level therein, whereby the pressure upon the fuel in said container varies with the pressure in said chamber.

3. The invention as set forth in claim 2, in combination with a port extending between said chamber and the main fuel outlet conduit.

4. The invention as set forth in claim 2, in combination with a port extending between said chamber and the main fuel outlet conduit, and valve means for controlling the rate of flow of air through said chamber, thereby to control the rarefaction established therein by any given pressure difference between the air inlet and mixture outlet ends of said passage.

5. In a carburetor, the combination with a fuel container, of an air-mixture passage having an air inlet and a mixture outlet, said passage having an intermediate restricted portion above the container fuel level, an atomizer adjacent said restricted portion, a main fuel conduit connecting said atomizer and said container, a chamber above the container fuel level, a well adjacent to said container and having a portion thereof traversed by said main fuel conduit, pressure controlling conduits leading to said chamber from said main fuel conduit and said air inlet passage, a conduit connecting said container above the fuel level thereof and said well and a second conduit connecting said chamber and said well whereby the pressure in the container is influenced by the pressure in the chamber, and a main fuel nozzle in that portion of the well traversed by the main fuel conduit and adapted to supply the atomizer with fuel.

6. In a carburetor, the combination with a fuel container, of an air-mixture passage having an air inlet and a mixture outlet, said passage having an intermediate restricted portion above the container fuel level, an atomizer adjacent to said restricted portion, a main fuel conduit connecting said atomizer and said container, a chamber above the container fuel level, a well adjacent to said container, an idling conduit passing through said well and communicating therewith, connecting said container and said fuel mixture outlet, an idling nozzle in said idling conduit, a conduit connecting said container and said well and a second conduit connecting said chamber and said well, whereby the pressure in the container is influenced by the pressure in the chamber, and pressure controlling conduits leading into said chamber from said main fuel conduit, the air inlet passage and the idling conduit.

7. A carburetor, having in combination, a fuel container, an air-mixture passage having an air inlet and a mixture outlet, said passage having an intermediate restricted portion, an atomizer adjacent to said restricted portion, a main fuel conduit connecting said atomizer and said container, an idling conduit connecting said container and said mixture outlet, a well adjacent to said container, having a fuel communication with the main fuel conduit and the idling conduit, a chamber above the container fuel level, a conduit connecting said well and said container, a second conduit connecting said well and said chamber and pressure controlling conduits leading to said chamber from said main fuel conduit, said inlet air passage and the idling conduit.

In testimony whereof I affix my signature.

AUGUST LEANDER NILSSON.